(12) United States Patent
Marzella et al.

(10) Patent No.: US 11,001,376 B2
(45) Date of Patent: May 11, 2021

(54) PRECISION POINTING MODE OF AN AIRCRAFT

(71) Applicant: Sikorsky Aircraft Corporation, Stratford, CT (US)

(72) Inventors: Steven D. Marzella, Waterbury, CT (US); David L. Adams, Wallingford, CT (US); William C. Fell, Stuart, FL (US); Matthew T. Luszcz, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 385 days.

(21) Appl. No.: 16/057,346

(22) Filed: Aug. 7, 2018

(65) Prior Publication Data

US 2020/0047881 A1 Feb. 13, 2020

(51) Int. Cl.
*B64C 27/57* (2006.01)
*B64D 43/02* (2006.01)

(52) U.S. Cl.
CPC .............. *B64C 27/57* (2013.01); *B64D 43/02* (2013.01)

(58) Field of Classification Search
CPC .......... B64C 27/57; B64D 43/02; B64D 31/08
See application file for complete search history.

(56) References Cited

U.S. PATENT DOCUMENTS

| 8,463,465 | B2 | 6/2013 | Piasecki et al. |
| 8,855,837 | B2 | 10/2014 | Cherepinksy |
| 9,710,145 | B2* | 7/2017 | Zammit-Mangion ........ G06F 3/0488 |
| 9,727,059 | B2 | 8/2017 | Greenfield et al. |
| 2015/0367937 | A1* | 12/2015 | Greenfield ........... G05D 1/0858 701/4 |
| 2017/0029093 | A1* | 2/2017 | Eller ................. B64C 27/57 |
| 2017/0210463 | A1* | 7/2017 | Koessick ............... F16F 15/02 |
| 2017/0351270 | A1 | 12/2017 | Luszcz et al. |
| 2019/0250606 | A1* | 8/2019 | Oltheten ............. G05D 1/0858 |

* cited by examiner

*Primary Examiner* — Rodney A Bonnette
(74) *Attorney, Agent, or Firm* — Michael Best & Friedrich LLP

(57) ABSTRACT

An aircraft is provided including at least one pilot input and a flight control system n communication with the at least one pilot input. The flight control system is operable in a manual mode and a pointing mode. In the manual mode, a velocity, position, and attitude of the aircraft are controlled manually, and in the pointing mode, at least one of the velocity and position of the aircraft is controlled by the flight control system and at least one of the attitude and heading of the aircraft is controlled manually.

19 Claims, 5 Drawing Sheets

PRECISION POINTING MODE OF AN AIRCRAFT

BACKGROUND

The subject matter disclosed herein relates to a rotary wing aircraft, and more particularly, to operation of a rotary wing aircraft in a precision pointing mode where the aircraft is aimed at an external reference point, such as a target or point of interest Coaxial compound rotary wing aircrafts provide a unique expanded flight envelope as a result of having two controllable thrust vectors generated by the main rotor assembly and the propeller. Such rotary wing aircrafts may be manipulated to track an identified target. The precision pointing of the aircraft that occurs during such tracking may be accomplished by manual or coupled manipulation of one or more controls of the aircraft, such as collective, cyclic, yaw pedals, and the propeller for example. The manual operation of these controls, as well as the variation in the operation environments and aircraft performance results in an increased work load for the operators of the aircraft. As a result, precision and mode predictability is reduced.

BRIEF DESCRIPTION

According to an embodiment, an aircraft is provided including at least one pilot input and a flight control system n communication with the at least one pilot input. The flight control system is operable in a manual mode and a pointing mode. In the manual mode, a velocity, position, and attitude of the aircraft are controlled manually, and in the pointing mode, at least one of the velocity and position of the aircraft is controlled by the flight control system and at least one of the attitude and heading of the aircraft is controlled manually.

In addition to one or more of the features described above, or as an alternative, in further embodiments the flight control system controls maintains at least one of the velocity and position of the aircraft as constant.

In addition to one or more of the features described above, or as an alternative, in further embodiments comprising at least one sensor for providing environmental configurations and aircraft state data to the flight control system, wherein in response to data from the at least one sensor the flight control system adjusts a control surface of the aircraft to maintain one of the velocity and position of the aircraft.

In addition to one or more of the features described above, or as an alternative, in further embodiments comprising a haptic-feedback device operably coupled to the at least one pilot input to indicate to an operator when the attitude of the aircraft is approaching an allowable limit.

In addition to one or more of the features described above, or as an alternative, in further embodiments the haptic-feedback device provides a tactile cue to the operator.

In addition to one or more of the features described above, or as an alternative, in further embodiments the haptic-feedback device provides an audible cue to the operator.

In addition to one or more of the features described above, or as an alternative, in further embodiments the haptic-feedback device provides a visual cue to the operator.

In addition to one or more of the features described above, or as an alternative, in further embodiments the flight control system includes a display and in the pointing mode, at least one attitude boundary line is illustrated on the display and a current attitude of the aircraft is shown on the display relative to the at least one attitude boundary line.

In addition to one or more of the features described above, or as an alternative, in further embodiments the flight control system is selectively operable in a pointing mode in response to a command.

In addition to one or more of the features described above, or as an alternative, in further embodiments the command includes identifying a target at which the aircraft is to be aimed.

In addition to one or more of the features described above, or as an alternative, in further embodiments the flight control system maintains an operational state of the aircraft when the pointing mode is initiated.

In addition to one or more of the features described above, or as an alternative, in further embodiments when the aircraft is hovering when the pointing mode is initiated, the flight control system is configured to maintain a position of the aircraft at a location in three dimensional space.

In addition to one or more of the features described above, or as an alternative, in further embodiments when the aircraft is cruising when the pointing mode is initiated, the flight control system is configured to maintain a cruising at a selected velocity.

In addition to one or more of the features described above, or as an alternative, in further embodiments the selected velocity is a velocity of the aircraft when the pointing mode is initiated.

In addition to one or more of the features described above, or as an alternative, in further embodiments the selected velocity is input by an operator.

According to another embodiment, a system for controlling an aircraft includes at least one control input, a flight control system for receiving commands from the at least one control input, and a haptic-enabled device operable to indicate to an operator of the aircraft that an attitude of the aircraft is approaching an allowable limit.

According to yet another embodiment, a method of operating an aircraft includes initiating operation in a pointing mode in response to an input, manually controlling at least one of an attitude and heading of the aircraft, and automatically maintaining at least one of a position and velocity of the aircraft via a flight control system while at least one of the attitude and heading of the aircraft is manually adjusted.

In addition to one or more of the features described above, or as an alternative, in further embodiments comprising indicating to an operator when the attitude of the aircraft is approaching an allowable limit.

In addition to one or more of the features described above, or as an alternative, in further embodiments indicating when the attitude of the aircraft is approaching an allowable limit further comprises operating a haptic-feedback device associated with a control operable to manually control the attitude of the aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
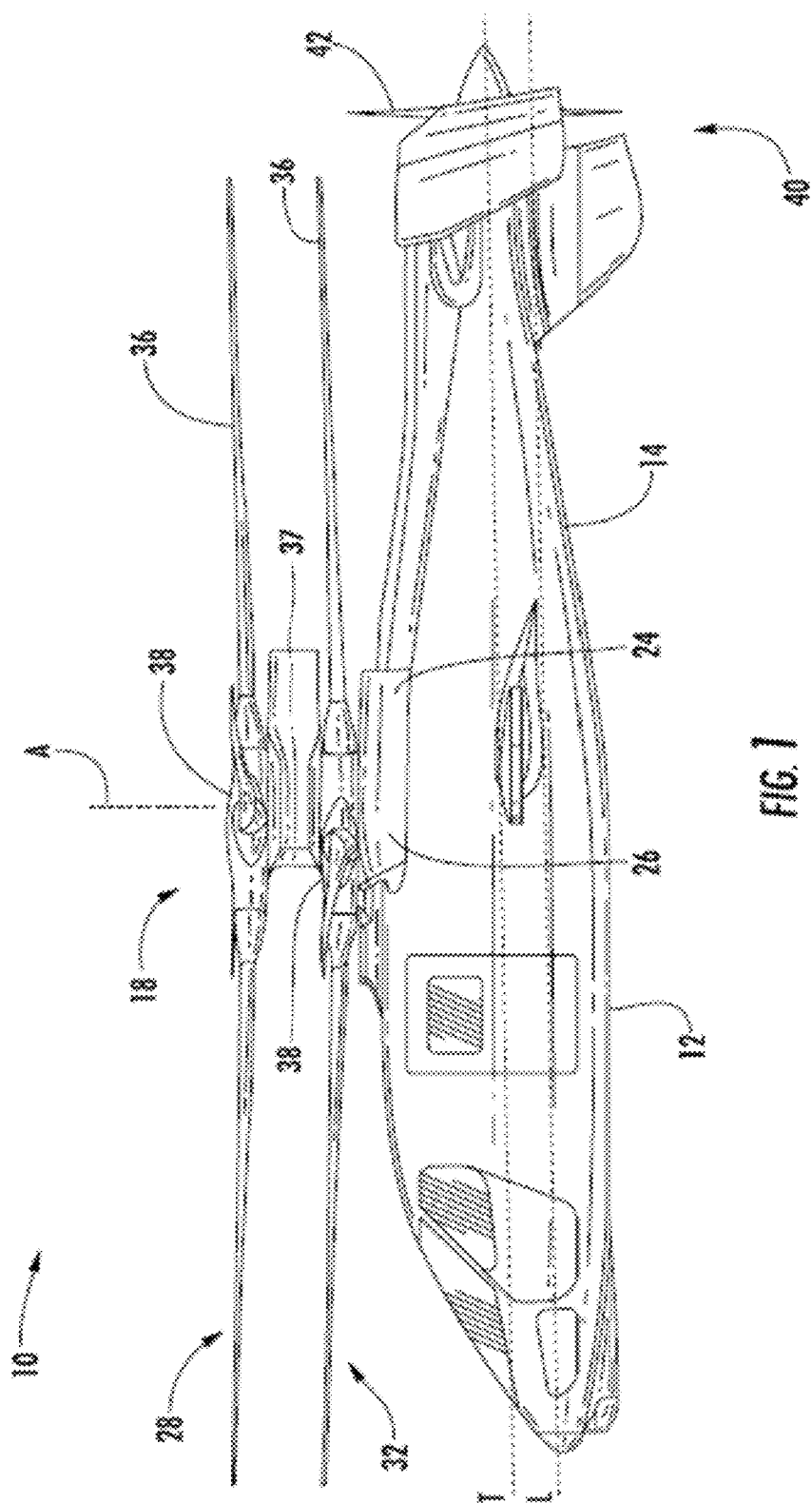
FIG. 1 is a side view of a rotary wing aircraft according to an embodiment.

FIG. 1 depicts an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an embodiment, the airframe 12 includes two seats for flight crew (e.g., pilot and co-pilot) and six seats for passengers. The main rotor assembly 18 is driven by a power source, for example, one or more engines 24 via a gearbox 26. The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. In some embodiments, the aircraft 10 further includes a translational thrust system 40 located at the extending tail 14 to provide translational thrust (forward or rearward) for aircraft 10.

Any number of blades 36 may be used with the rotor assembly 18. The rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft are also within the scope of this disclosure. Although, the dual rotor system is depicted as coaxial, embodiments include dual rotor aircraft having non-coaxial rotors.

The translational thrust system 40 includes a propeller 42 connected to and driven by the engine 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of propeller 42. While shown in the context of a pusher-prop configuration, it is understood that the propeller 42 could also be more conventional puller prop or could be variably facing so as to provide yaw control in addition to or instead of translational thrust. It should be understood that any such system or other translational thrust systems may alternatively or additionally be utilized. Alternative translational thrust systems may include different propulsion forms, such as a jet engine.

Figure 2:
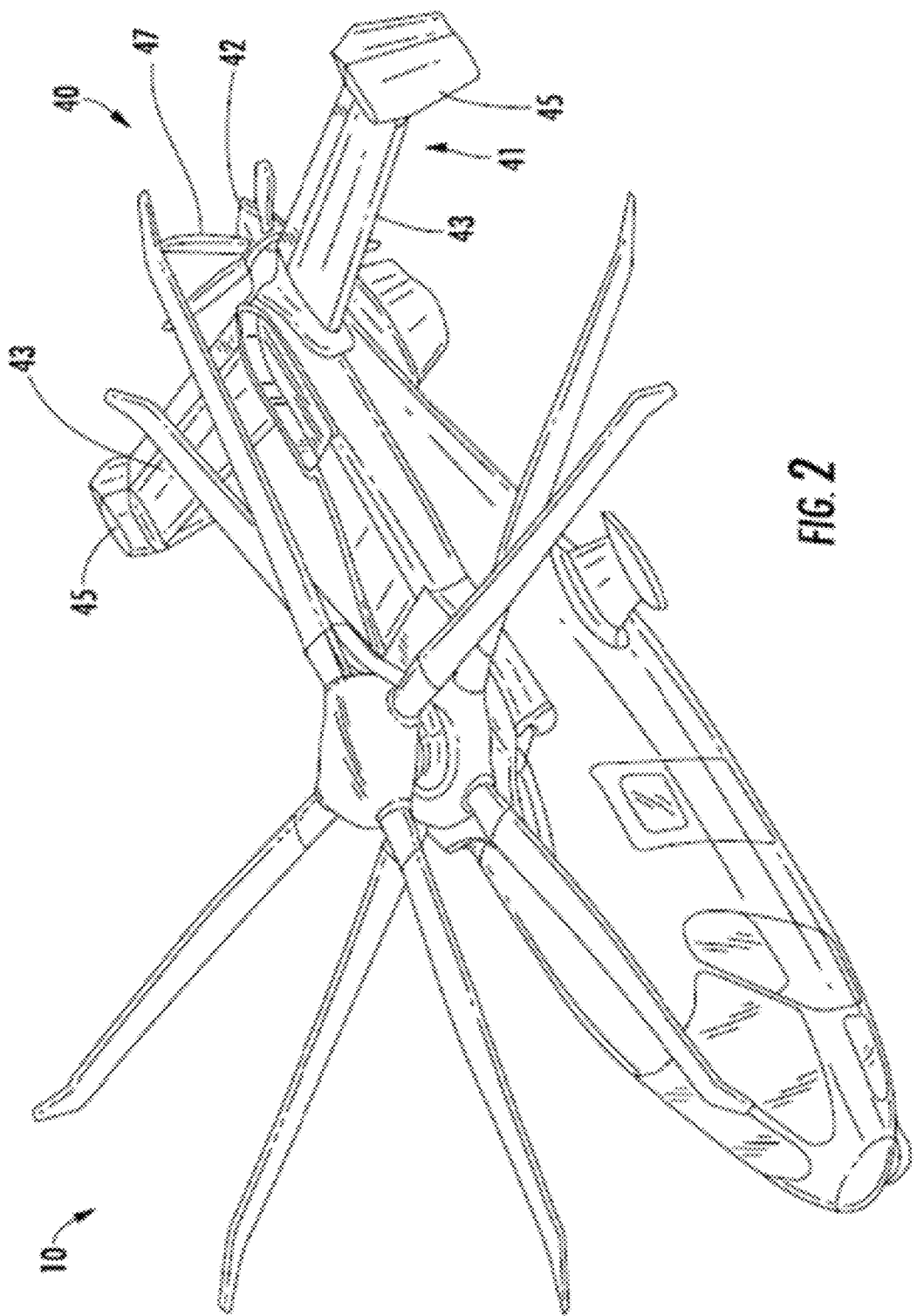
FIG. 2 is a perspective view of a rotary wing aircraft according to an embodiment.

Referring to FIG. 2, translational thrust system 40 includes a propeller 42 and is positioned at a tail section 41 of the aircraft 10. Propeller 42 includes a plurality of blades 47. In exemplary embodiments, the pitch of propeller blades 47 may be altered to change the direction of thrust (e.g., forward or rearward). The tail section 41 includes active elevators 43 and active rudders 45 as controllable surfaces.

Figure 3:
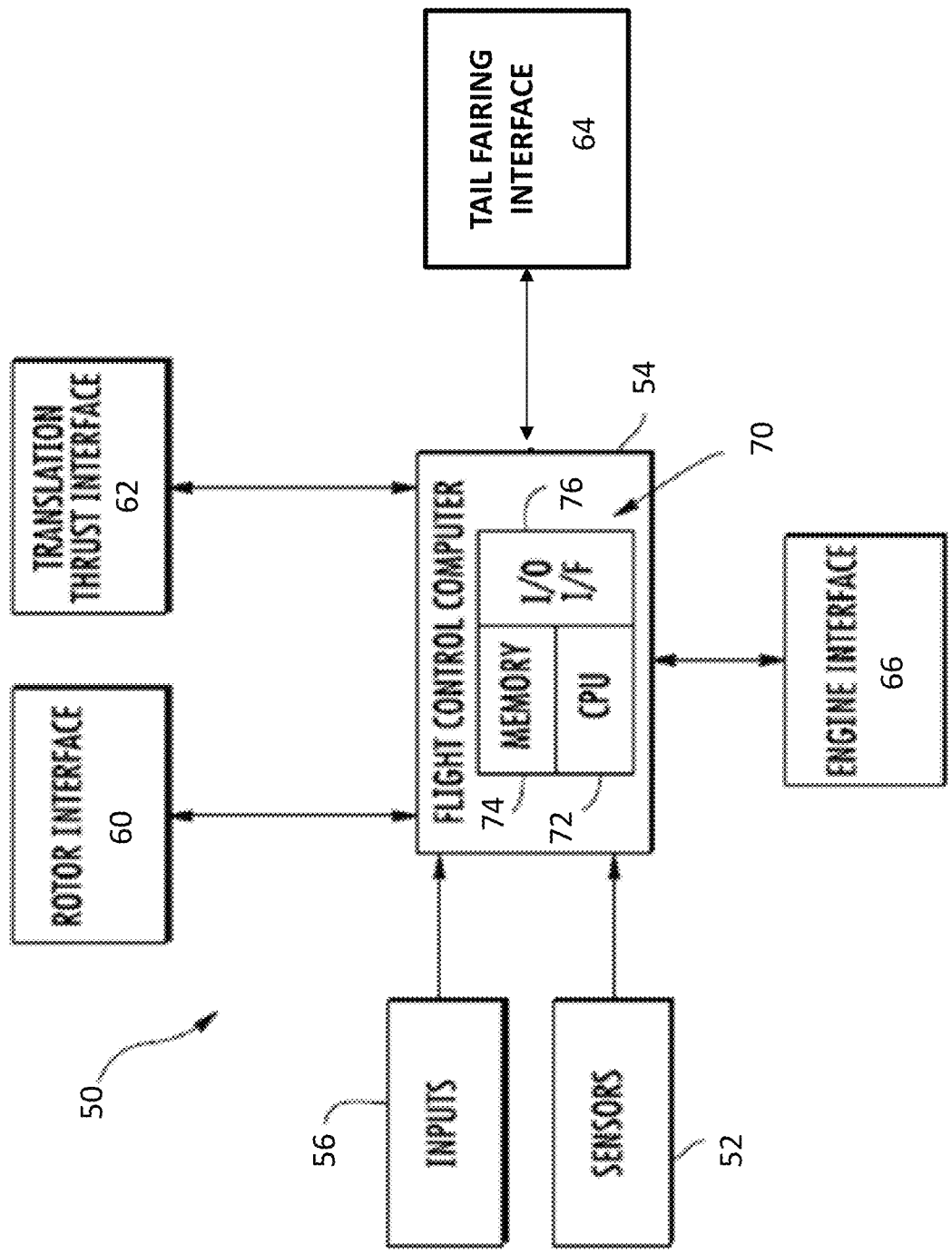
FIG. 3 depicts a flight control system according to an embodiment.

Portions of the aircraft 10 are controlled by a flight control system 50 illustrated in FIG. 3. In one embodiment, the flight control system 50 is a fly-by-wire (FBW) control system. In a FBW control system there is no direct mechanical coupling between a pilot's controls and movable components of aircraft 10. Instead of using mechanical linkages, a FBW control system includes a plurality of sensors 52 which can sense the position of controlled elements and generate electrical signals proportional to the sensed position. The sensors 52 may also be used directly and indirectly to provide a variety of aircraft state data to a flight control computer (FCC) 54. The FCC 54 may also receive inputs 56 as control commands from various sources. For instance, the inputs 56 can be pilot inputs, auto-pilot inputs, navigation system based inputs, or any control inputs from one or more control loops executed by the FCC 54 or other subsystems. In response to inputs from the sensors 52 and inputs 56, the FCC 54 transmits signals to various subsystems of the aircraft 10.

Flight control system 50 may include a rotor interface 60 configured to receive commands from the FCC 54 and control one or more actuators, such as a mechanical-hydraulic or electric actuators, for the upper rotor assembly 28 and lower rotor assembly 32. In an embodiment, inputs 56 including cyclic, collective, pitch rate, and throttle commands that may result in the rotor interface 60 driving the one or more actuators to adjust upper and lower swashplate assemblies (not depicted) for pitch control of the upper rotor assembly 28 and lower rotor assembly 32. Alternatively, pitch control can be performed without a swashplate assembly by using individual blade control (IBC) in the upper rotor assembly 28 and lower rotor assembly 32. The rotor interface 60 can manipulate the upper rotor assembly 28 and lower rotor assembly 32 independently. This allows different collective and cyclic commands to be provided to the upper rotor assembly 28 and lower rotor assembly 32.

Flight control system 50 may include a translational thrust interface 62 configured to receive commands from the FCC 54 to control one or more actuators, such as a mechanical-hydraulic or electric actuators, for the control of the translational thrust system 40. In an embodiment, inputs 56 may result in the translational thrust interface 62 controlling speed of propeller 42, altering the pitch of propeller blades 47 (e.g., forward or rearward thrust), altering the direction of rotation of propeller 42, and employing a clutch to engage or disengage the propeller 42, etc.

Flight control system 50 may include a tail fairing interface 64. The tail fairing interface 64 is configured to receive commands from the FCC 54 to control one or more actuators, such as a mechanical-hydraulic or electric actuators, for the active elevator 43 and/or active rudders 45 of FIG. 2. In an embodiment, inputs 56 include an elevator pitch rate command for the tail fairing interface 64 to drive the one or more actuators for pitch control of the active elevators 43 of FIG. 2. In an embodiment, inputs 56 include a rudder command for the tail fairing interface 64 to drive the one or more actuators for positional control of the active rudders 45 of FIG. 2.

Flight control system 50 may include an engine interface 66. The engine interface 66 is configured to receive commands from the FCC 54 to control engine(s) 24. In an embodiment, inputs 56 include a throttle command from the pilot to adjust the RPM of engine(s) 24. FCC 54 may also send commands to engine interface 66 to control the engine(s) in certain predefined operating modes (e.g., quiet mode).

The FCC 54 includes a processing system 70 that applies models and control laws to augment commands based on aircraft state data. The processing system 70 includes processing circuitry 72, memory 74, and an input/output (I/O) interface 76. The processing circuitry 72 may be any type or combination of computer processors, such as a microprocessor, microcontroller, digital signal processor, application specific integrated circuit, programmable logic device, and/or field programmable gate array, and is generally referred to as central processing unit (CPU) 72. The memory 74 can include volatile and non-volatile memory, such as random access memory (RAM), read only memory (ROM), or other electronic, optical, magnetic, or any other computer readable storage medium onto which data and control logic as described herein are stored. Therefore, the memory 74 is a tangible storage medium where instructions executable by the processing circuitry 72 are embodied in a non-transitory form. The I/O interface 76 can include a variety of input interfaces, output interfaces, communication interfaces and support circuitry to acquire data from the sensors 52, inputs 56, and other sources (not depicted) and communicate with the rotor interface 60, the translation thrust interface 62, tail faring interface 64, engine interface 66, and other subsystems (not depicted).

In exemplary embodiments, the rotor interface 60, under control of the FCC 54, can control the upper rotor assembly 28 and lower rotor assembly 32 to pitch in different magnitudes and/or different directions at the same time. This includes differential collective, where the upper rotor assembly 28 has a collective pitch different than the collective pitch of the lower rotor assembly 32, in magnitude and/or direction. Differential pitch control also includes differential cyclic pitch control, where the upper rotor assembly 28 has a cyclic pitch different than the cyclic pitch of the lower rotor assembly 32, in magnitude, axis of orientation (e.g., longitudinal or lateral) and/or direction. The differential collective and the differential cyclic pitch control may be accomplished using independently controlled swashplates in the upper rotor assembly 28 and lower rotor assembly 32. Alternatively, differential collective and the differential cyclic pitch control may be accomplished using individual blade control in the upper rotor assembly 28 and lower rotor assembly 32.

The ability to independently control the pitch of the upper rotor assembly 28 and lower rotor assembly 32 allows the lower rotor assembly 32 to be adjusted due to its position beneath the upper rotor assembly 28. The lower rotor assembly 32 is located in the downwash of the upper rotor assembly 28. To accommodate for this, the lower rotor assembly 32 may have a collective pitch that differs from the collective pitch of the upper rotor assembly 28.

The use of the translational thrust system 40 allows the aircraft 10 to move forward or rearward (depending on the pitch of the propeller blades) independent of the pitch attitude (e.g. the angle of the longitudinal axis L relative to horizontal) of the aircraft. Cyclic is used to adjust the pitch attitude (nose up, nose down or level) of the aircraft while the translational thrust system 40 provides forward and rearward thrust.

Figure 4:
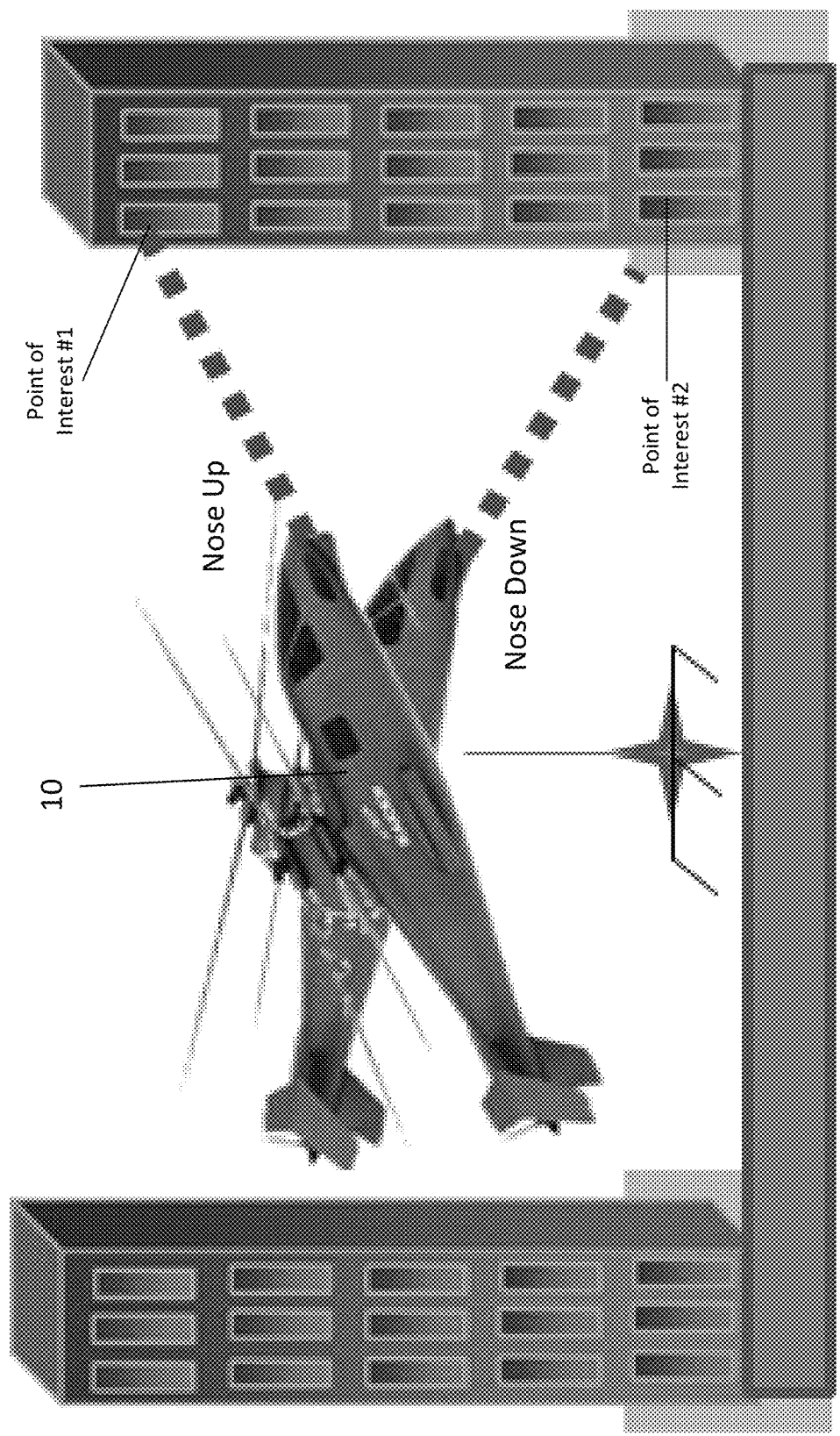
FIG. 4 is a side view of an aircraft aimed at a target or point of interest according to an embodiment.

Operation of the aircraft 10 may be controlled to aim the aircraft 10 at a target or point of interest. FIG. 4 depicts an example of an aircraft 10 aimed at a target in both a nose up and a nose down orientation. In the nose up configuration, longitudinal cyclic is induced on the main rotor assembly 18 causing the rotor assembly to tilt aft and a rearward thrust vector to be generated. In the nose down configuration, longitudinal cyclic is induced on the main rotor assembly 18 causing the rotor assembly to tilt forward and a forward thrust vector to be generated. In an embodiment, a pitch of the propeller blades 47 of the translational thrust system 40 may be adjusted to counteract the thrust vector generated by the main rotor assembly 18 to hold the aircraft 10 at a desired position, commonly referred to as "hovering." While a portion of the aircraft 10 is aimed or pointed at a target or point of interest, lateral cyclic and collective of the main rotor assembly 18 may also be employed to maintain the stability of the aircraft 10.

The flight control system 50 is typically operable in a normal or manual mode where various parameters, such as velocity, position, and attitude of the aircraft are controlled manually by an operator of the aircraft. In an embodiment, the flight control system 50 is selectively operable in a precision pointing mode. During a precision pointing mode, the flight control system 50 is configured to automatically maintain the position and/or velocity of the aircraft 10 while allowing an operator to vary the attitude or heading of the aircraft 10. This automatic control of the position and/or velocity is more effective than if such operations were performed manually by an operator or the flight crew, by independent adjustment to main rotor thrust and propulsor thrust. In an embodiment, operation of the flight control computer 54 is initiated in the precision pointing mode in response to an input command. Control command inputs may include one or more of pilot inputs, auto-pilot inputs, navigation system based inputs, and any control input from one or more control loops executed by the flight control system. In an embodiment, the input command includes identifying a target or point of interest at which the aircraft 10 is to be aimed.

In the precision pointing mode, the flight control system 50 is operable to maintain a generally constant position or velocity of the aircraft 10, within the performance envelope of the air vehicle. In an embodiment, if the precision pointing mode is initiated while the aircraft 10 is hovering at a location, the flight control system 50 is configured to maintain the position of the aircraft 10 at that location in three dimensional space. Alternatively, if the precision pointing mode is initiated while the aircraft 10 is cruising, the flight control system 50 may be configured to maintain the current cruise velocity of the aircraft 10. In other embodiments, the position and/or velocity to be maintained by the flight control system 50 may be provided as an input to the system 50, such as by an operator for example, distinct from the operational status of the aircraft 10 at the time the precision pointing mode is initiated. The precision pointing mode determines and displays an attitude window, cued to the pilot, based upon the air vehicle performance (main rotor and propulsor thrust limits) and the ability of the ability to maintain position or velocity. This may be used in conjunction with at least one of a pilot's visual identification of a point of interest and the pilot's ability to slew the aircraft attitude to align the nose with the identified point of interest (see FIG. 4 and FIG. 5).

One or more sensors, such as sensors 52 for example, may be used to track a particular target after the target has been identified. The sensors 52 provide environmental configurations and aircraft state data to the flight control system 50. The flight control system 50 in turn analyzes the sensor data and adjusts one or more control surfaces of the aircraft, such as of the main rotor assembly 18 and/or the translational thrust system 40 for example, to either maintain the position of the aircraft 10 or maintain the velocity of the aircraft 10.

Environmental conditions that may be sensed include, but are not limited to atmospheric air temperature, atmospheric air pressure, atmospheric air density, relative wind speed, weather, terrain, terrain slope, obstacles, targets and proximate flying objects. Aircraft state data that may be sensed includes, but is not limited to aircraft geolocation, altitude, attitude, speed, weight, center of gravity, vibration, control surface positions, rotor RPM, rotor blade pitch, rotor blade azimuth location, and translational thrust system RPM.

In response to receiving information identifying a target, such as from a weapons computer or a manual pilot input command for example, the flight control computer when operated in a precision pointing mode will determine an adjusted position of one or more control surfaces of the aircraft 10 to either maintain the position of the aircraft or to achieve a desired velocity of the aircraft 10. The precision pointing mode is configured to tailor the control response, such as the magnitude and direction of thrust to be provided by the translational thrust system 40 or the lateral cyclic and collective of the main rotor assembly 18 for example, based on the measured flight conditions.

In an embodiment, regardless of whether the aircraft is operating in the "precision pointing mode," an operator of the aircraft 10 may be able to manually override the commands automatically generated by the flight control system 50 and provide control inputs to the flight control computer 54. Further, once the aircraft 10 is in the "precision pointing mode," the flight control system 50 operates using corresponding control laws. In one embodiment, the aircraft flight control system operates with proportional control laws such that the pilot inputs are essentially directly correlated to control displacement. However, embodiments having another type of correlation between the inputs and the displacement is also contemplated herein.

One of the cockpit controllers or pilot inputs 56 commonly included in a rotary wing aircraft is a beeper. The beeper is typically movable from a neutral position, to either a forward, aft, left, or right position. When the aircraft 10 is in "precision pointing mode," actuation of the beeper may be used to adjust the attitude or heading of the aircraft 10. For example, each movement of the beeper from the neutral position to one of the forward, aft, left or right positions is configured to slew the pitch attitude at a defined rate in a corresponding direction. Thus, if the aircraft 10 is in neutral attitude (i.e. the longitudinal axis is oriented horizontally), the pilot may manually adjust the pitch attitude of the main rotor assembly 18 and propulsor by repeatedly operating the beeper to incrementally transition the main rotor assembly 18 to a desired position. In an embodiment, each movement of the beeper provides a fine adjustment of the attitude. However, in other embodiments, the beeper may be adapted to provide larger macro adjustments and/or variable adjustments to the attitude of the aircraft, in order to optimize the aircraft response to pointing angle.

Figure 5:
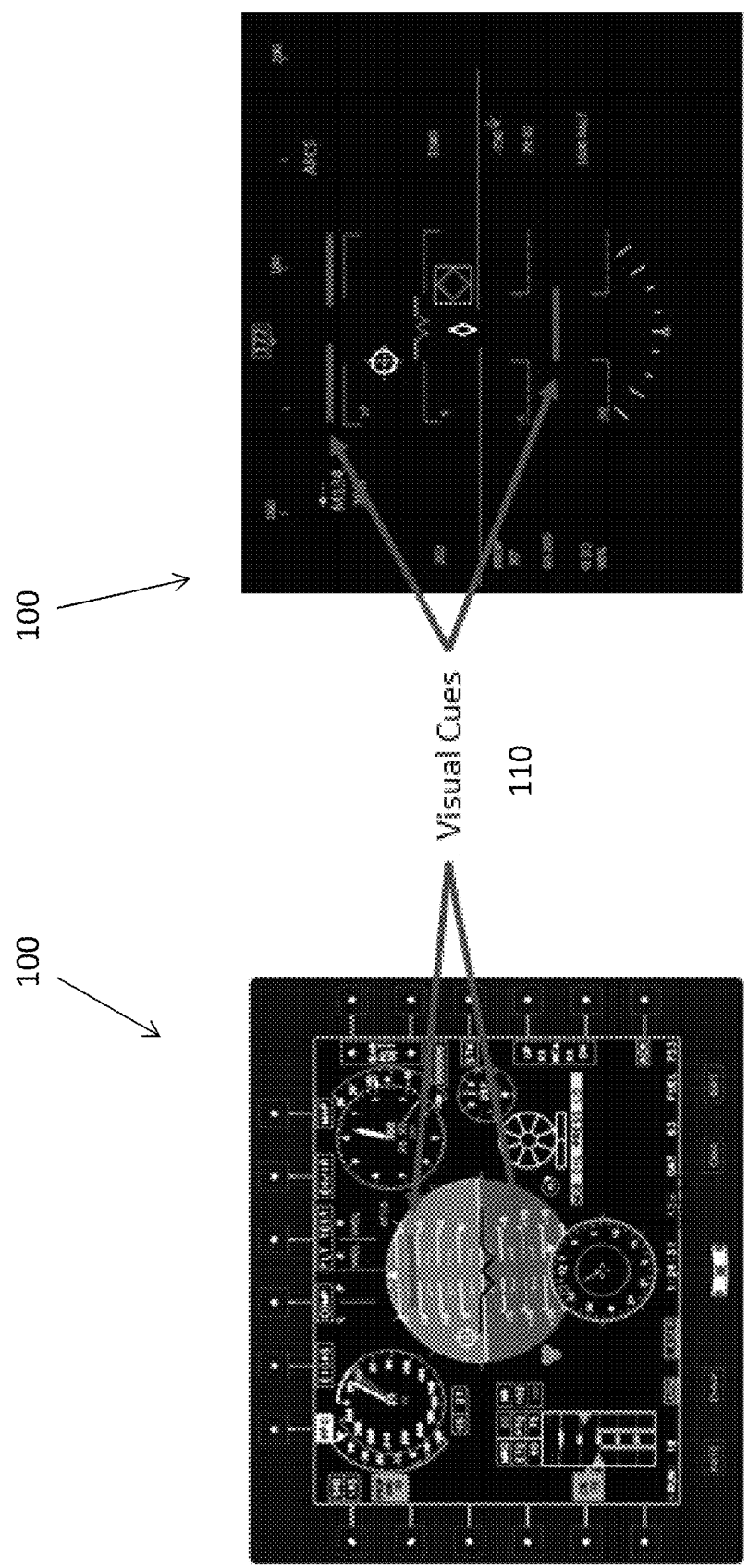
FIG. 5 is a diagram illustrating various displays associated with an aircraft according to an embodiment.

Although a beeper is described as the control mechanism operable to adjust the attitude or heading of the aircraft 10, in other embodiments, other types of controls, such as cyclic and yaw pedals for example, may be used. In some embodiments, the one or more controls operable to adjust the pitch attitude of the aircraft 10 may include or may be coupled to a haptic enabled device. The haptic enabled device is operable to provide feedback to an operator to indicate that one or more parameters associated with operation of the aircraft 10 are approaching an allowable limit. The feedback provided to the controls may include an audible, visual, or tactile indication to the operator. For example, as best shown in FIG. 5, the attitude control may be coupled to a display 100 and one or more visual cues 110, such as boundary lines for example, are illustrated on the display during operation in the pointing precision mode. The boundary lines 110 indicate hard limits regarding operation of the aircraft and may be defined by the performance of the aircraft 10. As the attitude of the aircraft 10 is adjusted via the control, the attitude of the aircraft 10 is graphically represented on the display in real time as moving relative to the boundary lines. In an embodiment, the boundary lines 110 may only appear on the display 100 upon initiation in the precision pointing mode.

The precision pointing mode as described herein provides a mode of control of the aircraft including cueing to improve performance of the aircraft while reducing the work load of the crew.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
   at least one pilot input;
   a flight control system in communication with the at least one pilot input, the flight control system being operable in a manual mode and a pointing mode, wherein in the manual mode, a velocity, a hovering position, and an attitude of the aircraft are controlled manually, and in the pointing mode where the aircraft is controllably aimed at an external point of interest, at least one of the velocity and the hovering position of the aircraft is controlled by the flight control system and at least one of the attitude and heading of the aircraft is controlled manually.

2. The aircraft of claim 1, wherein the flight control system maintains at least one of the velocity and the hovering position of the aircraft as constant.

3. The aircraft of claim 1, further comprising at least one sensor for providing environmental configurations and aircraft state data to the flight control system, wherein in response to data from the at least one sensor the flight control system adjusts a control surface of the aircraft to maintain one of the velocity and the hovering position of the aircraft.

4. The aircraft of claim 1, further comprising a haptic-feedback device operably coupled to the at least one pilot input to indicate to an operator when the attitude of the aircraft is approaching an allowable limit.

5. The aircraft of claim 4, wherein the haptic-feedback device provides a tactile cue to the operator.

6. The aircraft of claim 4, wherein the haptic-feedback device provides an audible cue to the operator.

7. The aircraft of claim 4, wherein the haptic-feedback device provides a visual cue to the operator.

8. The aircraft of claim 7, wherein the flight control system includes a display and in the pointing mode, at least one attitude boundary line is illustrated on the display and a current attitude of the aircraft is shown on the display relative to the at least one attitude boundary line.

9. The aircraft of claim 1, wherein the flight control system is selectively operable in the pointing mode in response to a command.

10. The aircraft of claim 9, wherein the command includes identifying a target as the point of interest at which the aircraft is to be aimed.

11. The aircraft of claim 1, wherein the flight control system maintains an operational state of the aircraft when the pointing mode is initiated.

12. The aircraft of claim 11, wherein when the aircraft is hovering when the pointing mode is initiated, the flight control system is configured to maintain the hovering position of the aircraft at a location in three dimensional space.

13. The aircraft of claim 11, wherein when the aircraft is cruising when the pointing mode is initiated, the flight control system is configured to maintain a cruising at a selected velocity.

14. The aircraft of claim 13, wherein the selected velocity is a velocity of the aircraft when the pointing mode is initiated.

15. The aircraft of claim 13, wherein the selected velocity is input by an operator.

16. A system for controlling an aircraft comprising:
at least one control input;
a flight control system for receiving commands from the at least one control input and a display, the flight control system being operable in a manual mode and a pointing mode; and
a haptic-enabled device operable to indicate to an operator of the aircraft that an attitude of the aircraft is approaching an allowable limit,
wherein in the pointing mode, at least one attitude boundary line is illustrated on the display and a current attitude of the aircraft is shown on the display relative to the at least one attitude boundary line.

17. A method of operating an aircraft comprising:
initiating operation in a pointing mode in which the aircraft is controllably aimed at an external point of interest in response to an input;
manually controlling at least one of an attitude and heading of the aircraft; and
automatically maintaining at least one of a hovering position and velocity of the aircraft via a flight control system while at least one of the attitude and heading of the aircraft is manually adjusted.

18. The method of claim 17, further comprising indicating to an operator when the attitude of the aircraft is approaching an allowable limit.

19. The method of claim 18, wherein indicating when the attitude of the aircraft is approaching an allowable limit further comprises operating a haptic-feedback device associated with a control operable to manually control the attitude of the aircraft.

\* \* \* \* \*